US008149731B2

(12) United States Patent
Ervin et al.

(10) Patent No.: US 8,149,731 B2
(45) Date of Patent: Apr. 3, 2012

(54) TECHNIQUE FOR TRANSFERRING DATA OVER A PACKET SWITCHED NETWORK

(75) Inventors: Jim P. Ervin, Raleigh, NC (US); Sanjeev D. Rampal, Cary, NC (US); Charles A. Carriker, Jr., Cary, NC (US); Thomas E. Black, Jr., Santa Rosa, CA (US)

(73) Assignee: Cisco Technology, Inc., San Jose, CA (US)

( * ) Notice: Subject to any disclaimer, the term of this patent is extended or adjusted under 35 U.S.C. 154(b) by 1086 days.

(21) Appl. No.: 10/876,127

(22) Filed: Jun. 24, 2004

(65) Prior Publication Data

US 2006/0013226 A1 Jan. 19, 2006

(51) Int. Cl.
*H04L 12/28* (2006.01)
*H04L 12/56* (2006.01)

(52) U.S. Cl. ..................................... 370/254; 370/400

(58) Field of Classification Search ............... 370/401, 370/230, 400, 254, 395.3, 352; 398/56, 45, 398/54; 709/223, 238
See application file for complete search history.

(56) References Cited

U.S. PATENT DOCUMENTS

| | | | | |
|---|---|---|---|---|
| 6,654,369 | B1* | 11/2003 | Pelisster et al. | 370/389 |
| 6,678,826 | B1* | 1/2004 | Kelly et al. | 726/2 |
| 6,725,264 | B1 | 4/2004 | Christy | |
| 6,985,488 | B2* | 1/2006 | Pan et al. | 370/395.3 |
| 7,136,374 | B1* | 11/2006 | Kompella | 370/352 |
| 7,181,141 | B1* | 2/2007 | Kapur et al. | 398/58 |
| 7,336,617 | B1* | 2/2008 | Liu | 370/252 |
| 7,426,179 | B1* | 9/2008 | Harshavardhana et al. | 370/219 |
| 7,606,235 | B1* | 10/2009 | Ayyangar et al. | 370/395.21 |
| 2001/0033548 | A1* | 10/2001 | Saleh et al. | 370/218 |
| 2003/0058804 | A1* | 3/2003 | Saleh et al. | 370/254 |
| 2004/0156313 | A1 | 8/2004 | Hofmeister et al. | |
| 2004/0170173 | A1* | 9/2004 | Pan et al. | 370/392 |
| 2005/0044262 | A1* | 2/2005 | Luo | 709/238 |
| 2005/0147104 | A1* | 7/2005 | Ould-Brahim | 370/395.5 |
| 2006/0155872 | A1* | 7/2006 | Charzinski et al. | 709/238 |

FOREIGN PATENT DOCUMENTS

| | | |
|---|---|---|
| EP | 05 75 7519 | 4/2009 |
| EP | 05 757 519.3 | 8/2009 |
| WO | WO 02/099571 | 12/2002 |

OTHER PUBLICATIONS

D. Awduche, "RFC 3209: RSVP-TE: Extensions to RSVP for LSP Tunnels," Dec. 2001, Network Working Group, p. 1-62.*

(Continued)

*Primary Examiner* — Dang Ton
*Assistant Examiner* — Ryan Kavleski
(74) *Attorney, Agent, or Firm* — Cesari and McKenna, LLP

(57) ABSTRACT

A technique transfers data over a packet-switched network (PSN), comprising a plurality of intermediate nodes, in a manner that does not require that the intermediate nodes support a network layer infrastructure. A network controller coupled to the intermediate nodes acquires topology information associated with the PSN's topology. This information may include pseudo-wire definitions, ingress and egress interface information, ingress and egress labels, and so on. The network controller generates a transport database from the topology information and distributes the transport database to the intermediate nodes. An intermediate node acquires the transport database information and configures a packet-processing engine (PPE), contained within the intermediate node, to process packets acquired by the intermediate node.

23 Claims, 10 Drawing Sheets

OTHER PUBLICATIONS

J. Lau, "Layer Two Tunneling Protocol (Version 3) Draft 13," Apr. 2004, Network Working Group, p. 1-89.*

E. Rosen, et al., "MPLS Label Stack Encoding," Request for Comments (RFC) 3032, Intenet Engineering Task Force (IETF), http://www.ietf.org, Jan. 2001, pp. 1-19.

E. Rosen, et al., "Multiprotocol Label Switching Architecture," RFC 3031, IETF, http://www.ietf.org, Jan. 2001, pp. 1-61.

A. Malis, et al., "PWE3 Fragmentation and Reassembly" draft-ietf-pwe3-fragmentation-03.txt, IETF, http://www.ietf.org, Oct. 2003, pp. 1-12.

A. Malis, et al., "SONET/SDH Circuit Emulation over Packet (CEP)," draft-ietf-pwe3-sonet-03.txt, IETF, http://www.ietf.org, Oct. 2003, pp. 1-49.

L. Martini, et al., "Encapsulation Methods for Transport of ATM Cells/Frame Over IP and MPLS Networks," draft-ietf-pwe3-atm-encap-03.txt, IETF, http://www.ietf.org, Oct. 2003, pp. 1-35.

L. Martini, et al., "Pseudowire Setup and Maintenance using LDP," draft-ietf-pwe3-control-protocol-04.txt, IETF, http://www.ietf.org, Oct. 2003, pp. 1-31.

L. Martini, et al., "Encapsulation Methods for Transport of Ethernet Frames Over IP/MPLS Networks," draft-ietf-pwe3-ethernet-encap-04.txt, IETF, http://www.ietf.org, Oct. 2003, pp. 1-19.

X.Xiao, et al., "Requirements for Pseudo-Wire Emulation Edge-to-Edge (PWE3)," draft-ietf-pwe3-requirements-07.txt, IETF, http://www.ietf.org, pp. 1-19.

S. Bryant, et al., "PWE3 Architecture," draft-ietf-pwe3-arch-06.txt, IETF, http://www.ietf.org, Oct. 2003, pp. 1-46.

PCT Notification of Transmittal of the International Search Report and the Written Opinion of the International Searching Authority, or the Declaration and Corrected Written Opinion of the International Searching Authority, International Application No. PCT/US05/20155, International Filing Date Jun. 9, 2005, Date of Mailing Aug. 21, 2007, 8 pages.

Unbehagan, Paul, et al., "BGP-Based Auto-Discovery for L2VPNs", L2VPN Networking Group, Internet Draft, (draft-hlmu-12vpn-bgp-discovery-00.txt), Feb. 2004, 14 pages.

Metz, Chris, "The Latest in VPNs: Part II," IEEE Internet Computing, IEEE Computer Society, vol. 8, No. 3, May 1, 2004, pp. 60-65.

* cited by examiner

TECHNIQUE FOR TRANSFERRING DATA OVER A PACKET SWITCHED NETWORK

BACKGROUND OF THE INVENTION

1. Field of the Invention

The present invention relates to data networks and specifically to transferring data over packet switched networks.

2. Background Information

A computer network is a geographically distributed collection of interconnected communication links and segments for transporting data between nodes, such as computer systems. Many types of network segments are available, with types ranging from local area networks (LANs) to wide area networks (WANs). LANs typically connect personal computers and workstations over dedicated, private communications links located in the same general physical location, such as a building or a campus. WANs, on the other hand, typically connect large numbers of geographically dispersed nodes over long-distance communications links, such as common carrier telephone lines. The Internet is an example of a WAN that connects disparate networks throughout the world, providing global communication between nodes on various networks. The nodes typically communicate over the network by exchanging discrete frames or packets of data according to predefined protocols, such as the Asynchronous Transfer Mode (ATM) protocol, Frame Relay (FR) protocol and the Transmission Control Protocol/Internet Protocol (TCP/IP). In this context, a protocol consists of a set of rules defining how the nodes interact with each other.

To interconnect dispersed computer networks, many organizations rely on the infrastructure and facilities of Service Providers (SPs). SPs typically own one or more transport networks that are configured to provide high-speed connections capable of handling traffic for many customers/subscribers. A transport network, as used herein, is a data network used to transport data within a SP's network. In a typical configuration, a customer/subscriber couples its dispersed networks to an edge router configured to enable access to the SP's network. The SP's network may comprise various switches configured to switch traffic between the various edge routers. The routers typically operate at layer-3 (L3) of a communications protocol stack, which is the network layer of the Open Systems Interconnect (OSI) reference model. The switches typically operate at layer-2 (L2) of the communications protocol stack, which is the data-link layer of the OSI reference model.

SPs often provide multiple services to their customers/subscribers, such as FR services and ATM services. Here, an SP may employ parallel or "overlay" networks wherein each network is configured to provide a specific service. For example, a SP that provides a FR service and an ATM service may employ two separate networks where each network provides a separate service. Providing separate networks for separate services, however, is often costly and difficult to manage; thus, many SPs employ a "converged network" to provide various services. A converged network is a network that converges various different services onto a single network, such as an optical network. Converged networks are often called "transport networks" in that they usually act only to transport various services' data from one point in the SP's network to another point in the network.

One way to implement a converged network is to employ a technique called "pseudo wire emulation edge-to-edge" (PWE3). PWE3 is described in S. Bryant et al., "PWE3 Architecture," draft-ietf-pwe3-arch-06.txt available from the Internet Engineering Task Force (IETF). PWE3 is a technique that emulates the essential attributes of a service, such as ATM or FR, over a packet-switched network (PSN), such as a Synchronous Optical NETwork/Synchronous Digital Hierarchy (SONET/SDH) network, which acts as a transport network. PWE3 utilizes pseudo wires (PWs), which are mechanisms that emulate the essential attributes of a particular service.

In a typical PWE3 arrangement, a customer's data is encapsulated at the ingress point (e.g., an "ingress" edge router") in the SP's network. The encapsulated data is transported over the SP's transport network via a predefined path, such as an IP path or a Multiprotocol Label Switching (MPLS) path, to an egress point in the SP's network (e.g., an "egress" edge router). The data is decapsulated at the egress point and delivered to the customer's remote network coupled to the egress point.

One problem associated with PWE3 implementations is that they often require both data-link layer and network layer support. For example, a network that employs the MPLS protocol to transfer data across PWs in a PWE3 network typically requires establishing a L3 infrastructure that may include defining sub-networks and implementing various routing and distribution protocols, such as the Open Shortest Path First (OSPF) routing protocol and the Label Distribution Protocol (LDP). Setting up a L3 infrastructure is often arduous and may require specialty knowledge of the protocols utilized in the infrastructure. SPs typically utilize L2 transport networks that often do not require a L3 infrastructure in order to operate. That is, these networks often transport data through the network using L2 switching techniques. To provide PW support as defined by PWE3, a SP would have to develop a L3 infrastructure within its network. Providing such an infrastructure may be costly.

SUMMARY OF THE INVENTION

The present invention overcomes shortcomings associated with prior techniques by providing a technique for supporting pseudo wires, contained in a data network comprising a plurality of intermediate nodes, in a manner that does not require a layer-3 (L3) infrastructure.

Briefly, a controller coupled to the intermediate nodes acquires topology information associated with the data network's topology. The topology information may include pseudo wire definitions, ingress and egress interface information, ingress and egress labels, and so on. The controller uses the topology information to generate a transport database containing information that defines, inter alia, paths associated with e.g., pseudo wires in the network. The data base information is distributed to the intermediate nodes, which utilize the information to process data packets acquired by the nodes including switching data along paths defined by the pseudo wires.

In the illustrated embodiment, a service provider's (SP) data network comprises a transport controller coupled to a plurality of intermediate nodes. The intermediate nodes comprise a packet-switched transport network used to transport data provided by customers/subscribers to the SP's network. The transport controller acquires topology information of the transport network including information associated with pseudo wires in the network and uses this information to generate a transport database containing information related to the pseudo wires. Information contained in the transport database is distributed to the intermediate nodes, which use the information to configure a packet-processing engine (PPE) contained in each intermediate node to switch data along paths defined by the pseudo wires.

A data packet acquired from the transport network by the intermediate node is transferred to the PPE, which passes the packet through various processing stages and eventually to an egress interface for transfer onto the transport network. Specifically, the packet enters the PPE and is transferred to a classifying stage, which associates the packet with an ingress key. The packet and the ingress key are then transferred to a rate control stage, which polices the packet based on various information rate parameters. Next, the packet and the ingress key are transferred to a data cross connect stage which "switches" the packet to an egress interface by identifying and associating an egress key with the packet. The egress key and the packet are then transferred to an egress encapsulation stage where the packet is encapsulated with, e.g., label information, if any. Finally, the packet is transferred to a traffic management stage, which schedules the packet for transfer to the egress interface logic for transfer onto the data network.

In sum, the inventive technique incorporates a transport controller to distribute a transport database containing information associated with transporting data through the network to intermediate nodes in the network, via pseudo wires. The intermediate nodes incorporate a PPE, which switches the packets based on information contained in the transport database. Advantageously, the inventive technique obviates the need to establish a L3 infrastructure in order to support pseudo wires in a network.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 1:
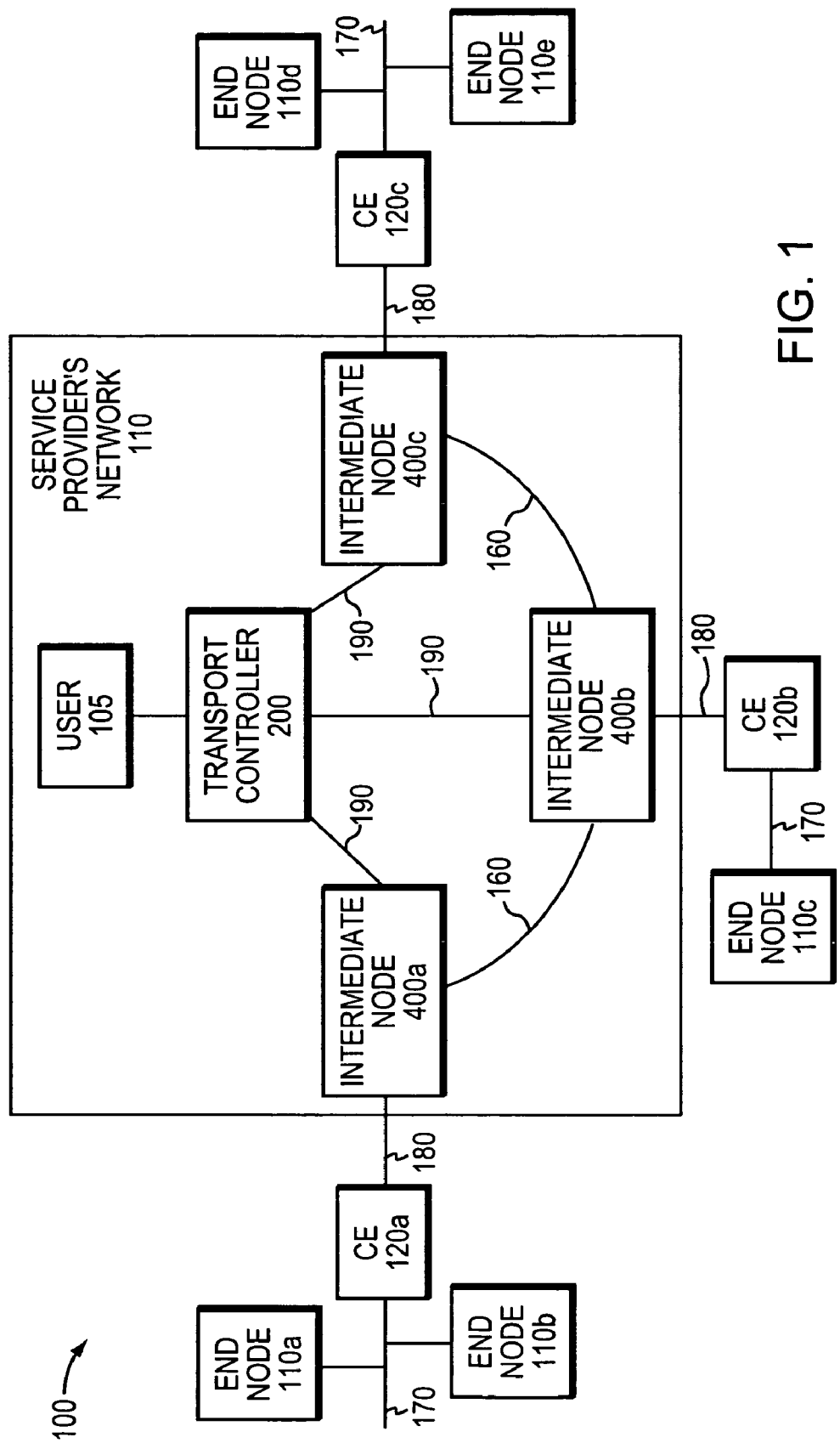
FIG. 1 is a schematic block diagram of a data network that may be advantageously used with the present invention.

FIG. 1 is a schematic block diagram of a data network 100 that may be advantageously used with the present invention. Network 100 comprises a plurality of end nodes 110 coupled to customer edge (CE) nodes 120 via local area network (LAN) connections 170. The CE nodes 120 are coupled to a service provider (SP) network 110 via data links 180, which illustratively are Ethernet links. The SP network 110 includes a transport network illustratively implemented as a packet-switch network (PSN) comprising a plurality of intermediate nodes 400 coupled via optical links 160. Network 110 also includes a "local" network comprising a transport controller 200 coupled to the intermediate nodes 400 via local network links 190. The local network enables the transport controller 200 to communicate with the intermediate nodes 400. These internetworked nodes in network 100 communicate by exchanging data packets according to a predefined set of protocols, such as the Transmission Control Protocol/Internet Protocol (TCP/IP) and the Synchronous Optical NETwork/Synchronous Digital Hierarchy (SONET/SDH) protocol. A protocol, as used herein, is a set of formal rules describing how to transfer data between two entities (e.g., intermediate nodes 400) in a data network.

The transport controller 200, inter alia, maintains network topology information that describes the data network's topology. Illustratively, the transport control acquires the topology information from a user 105 via, e.g., a network management system (NMS) operating on the transport controller 200. The topology information may include definitions of pseudo wires defined in the network 100. The transport controller 200 uses this information to generate a transport database (described below) that is transferred to the various intermediate nodes 400. It should be noted that other means may be used acquire the network's topology information, such as downloading the information to the transport controller 200. It should be further noted that the transport controller 200 may be configured as a transport circuit management system that is configured to manage various transport circuits in, e.g., the SP's network 110.

Figure 2:
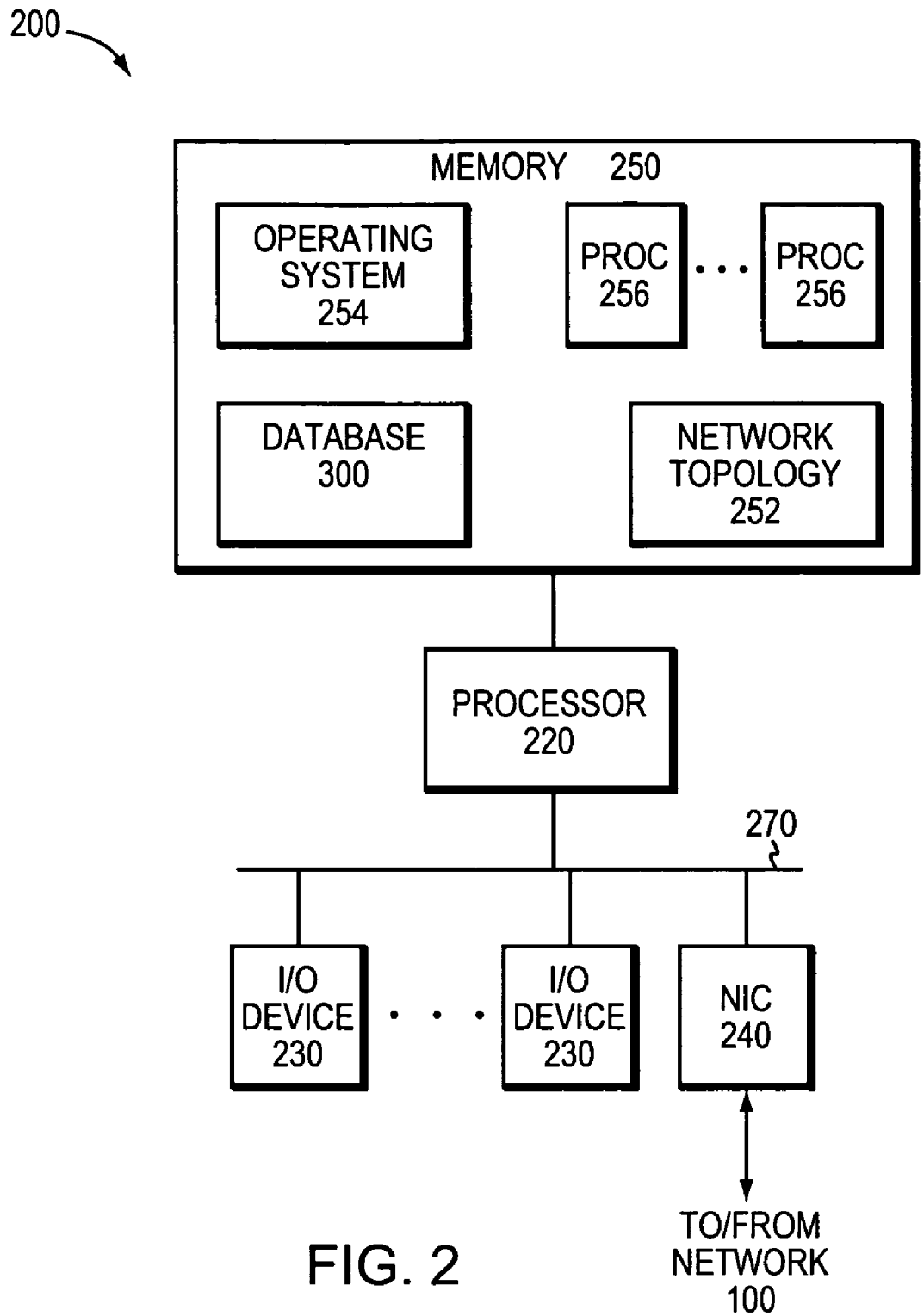
FIG. 2 is a high-level partial schematic block diagram of a transport network controller that may be advantageously used with the present invention.

FIG. 2 is a schematic block diagram of a transport controller 200 that may be advantageously used with the present invention. Controller 200 comprises a processor 220 coupled to various input/output (I/O) devices 230 and a network interface card (NIC) 240, via I/O bus 270, and to memory 250. The I/O devices 230 may include a display unit, such as a monitor, a keyboard, a mouse, and various storage devices, such as disk units. The NIC 240 contains logic that enables transport controller 200 to interface with the network 100 and communicate with the various intermediate nodes 400 via, e.g., links 190. An example of a system that may be used to implement the transport controller 200 is a personal computer (PC), such as a PC that is compatible with an International Business Machines (IBM) PC.

It should be noted that in the illustrated embodiment, links 190 comprise a preferred "out-of-band" network that enables communication between the transport controller 200 and the intermediate nodes 400. However, the inventive technique may be used in networks that employ "in-band" communication techniques to transfer data between the transport controller 200 and the intermediate nodes 400.

Memory 250 is a computer readable medium containing operating system 254, one or more software processes (PROCs) 256, network topology data structure 252 and transport database 300. Operating system 254 contains computer executable instructions executed by processor 220 to functionally organize the transport controller 200 by, inter alia, invoking operations in support of software processes 256 executing on the transport controller 200. These processes 256 may include software functions that implement various protocols supported by the transport controller 200, as well as processes that implement aspects of the inventive technique. It should be noted that other computer readable mediums, such as disk storage devices and flash memory devices, may be used to store computer executable instructions that implement aspects of the present invention.

The network topology data structure 252 holds information that illustratively describes the topology of the SP's network 110. This topology information may include descriptions of pseudo wires contained in the network 110 and defined, e.g., by a user logged into the transport controller 200. The transport controller 200 uses the topology information to generate transport database 300 containing, inter alia, pseudo wire path information that is used by the intermediate nodes 400 to illustratively transfer data through the SP's network 110.

Figure 3:
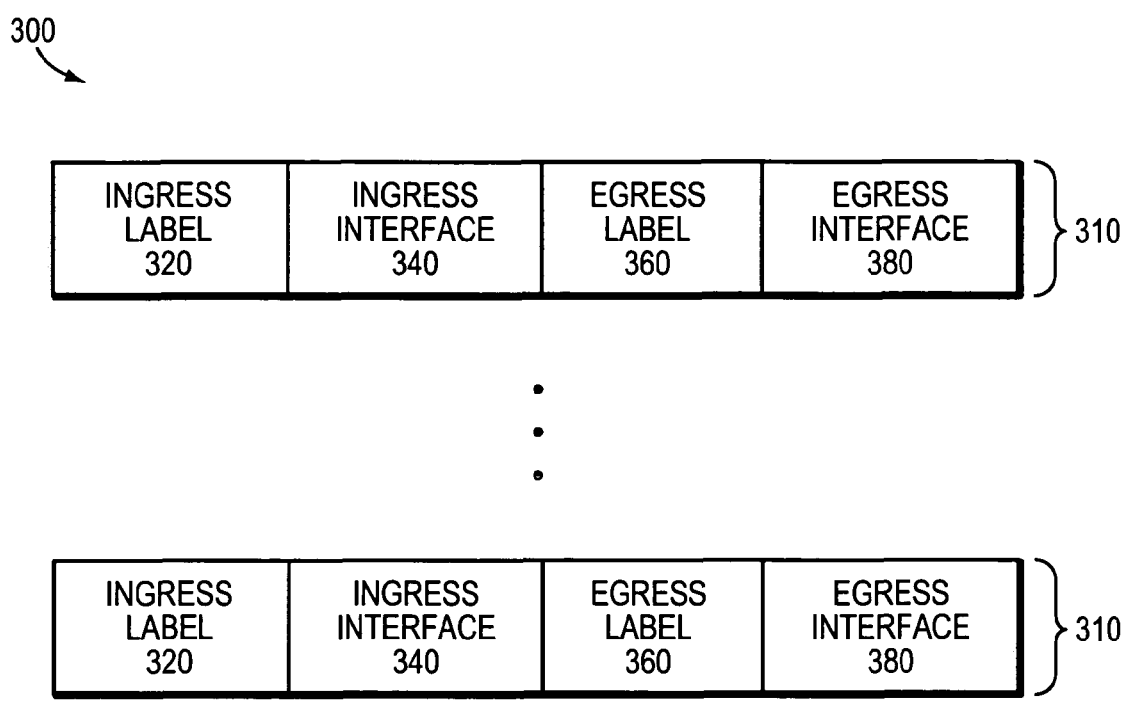
FIG. 3 is a partial schematic block diagram of a transport database that may be advantageously used with the present invention.

FIG. 3 is a partial schematic block diagram of a transport database 300 that may be advantageously used with the present invention. Database 300 is illustratively a table comprising one or more entries 310. Each entry 310 represents a mapping of an ingress interface/label combination with an egress interface/label combination and comprises an ingress label field 320, an ingress interface field 340, an egress label field 360 and an egress interface field 380. Note that, additional information may be contained in each database entry 310, such as an identifier that identifies a path and/or pseudo wire, an identifier that identifies a node 400 that is associated with the entry and so on.

The ingress label field 320 holds a value that represents a label associated with an input interface/sub-interface represented in the ingress interface field 340. Likewise, the egress label field 360 holds a value that represents a label associated with an egress interface/sub-interface represented in the egress interface field 380. Illustratively, the ingress label field 320 and the egress label field 360 hold Multiprotocol Label Switching (MPLS) labels that define a path associated with, e.g., a pseudo wire. A description of MPLS and MPLS label stack encoding may be found in E. Rosen, et al., "Multiprotocol Label Switching Architecture," Request For Comments (RFC) 3031, January 2001, and E. Rosen et al., "MPLS Label Stack Encoding," RFC 3032, January 2001, available from the Internet Engineering Task Force (IETF), both of which are hereby incorporated by reference as though fully set forth herein.

As used herein, a sub-interface refers to a portion of an interface. For example, a 100 megabits-per-second (Mbps) Ethernet interface may be apportioned into ten subinterfaces of 10 Mbps each or a single sub-interface of 100 Mbps. Also as used herein, unless otherwise noted, an interface generically refers to an interface or one or more subinterfaces.

Figure 4:
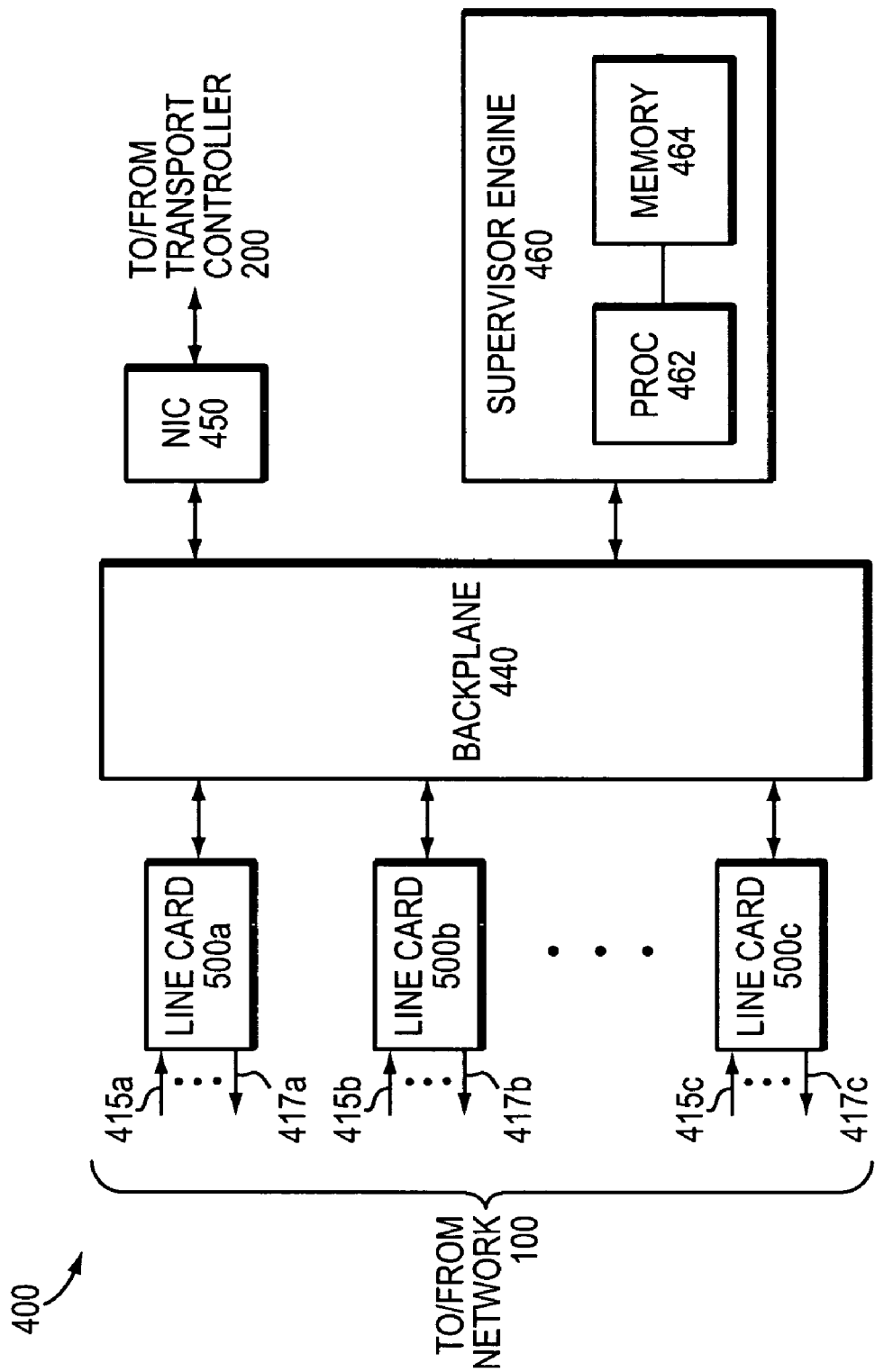
FIG. 4 is a partial schematic block diagram of an intermediate node that may be advantageously used with the present invention.

A pseudo wire path may be defined by one or more entries 310 in the transport database 300. Entries 310 associated with pseudo wire paths at a particular node 400 are distributed to that node 400. The node 400 uses this information to configure one or more packet-processing engines (PPEs) contained in the intermediate node 400. FIG. 4 is a partial schematic block diagram of an intermediate node 400 that may be advantageously used with the present invention. Node 400 is illustratively a data switch containing one or more line cards 500, a network interface card (NIC) 450 and a supervisor engine 460 interconnected by a backplane 440. The backplane 440 comprises a point-to-point interconnect bus that interconnects the various cards and allows data and signals to be transferred from one card to another. The supervisor engine 460 contains a processor 462 and memory 464 configured, inter alia, to enable the intermediate node 400 to process transport database information 300 acquired from the transport controller 200 and distribute the transport database information 300 to the various PPEs contained in node 400 in accordance with the inventive technique. The NIC 450 contains logic that enables the intermediate node 400 to transfer data between the intermediate node 400 and the transport controller 200 via a link 190 to the transport controller 200.

Figure 5:
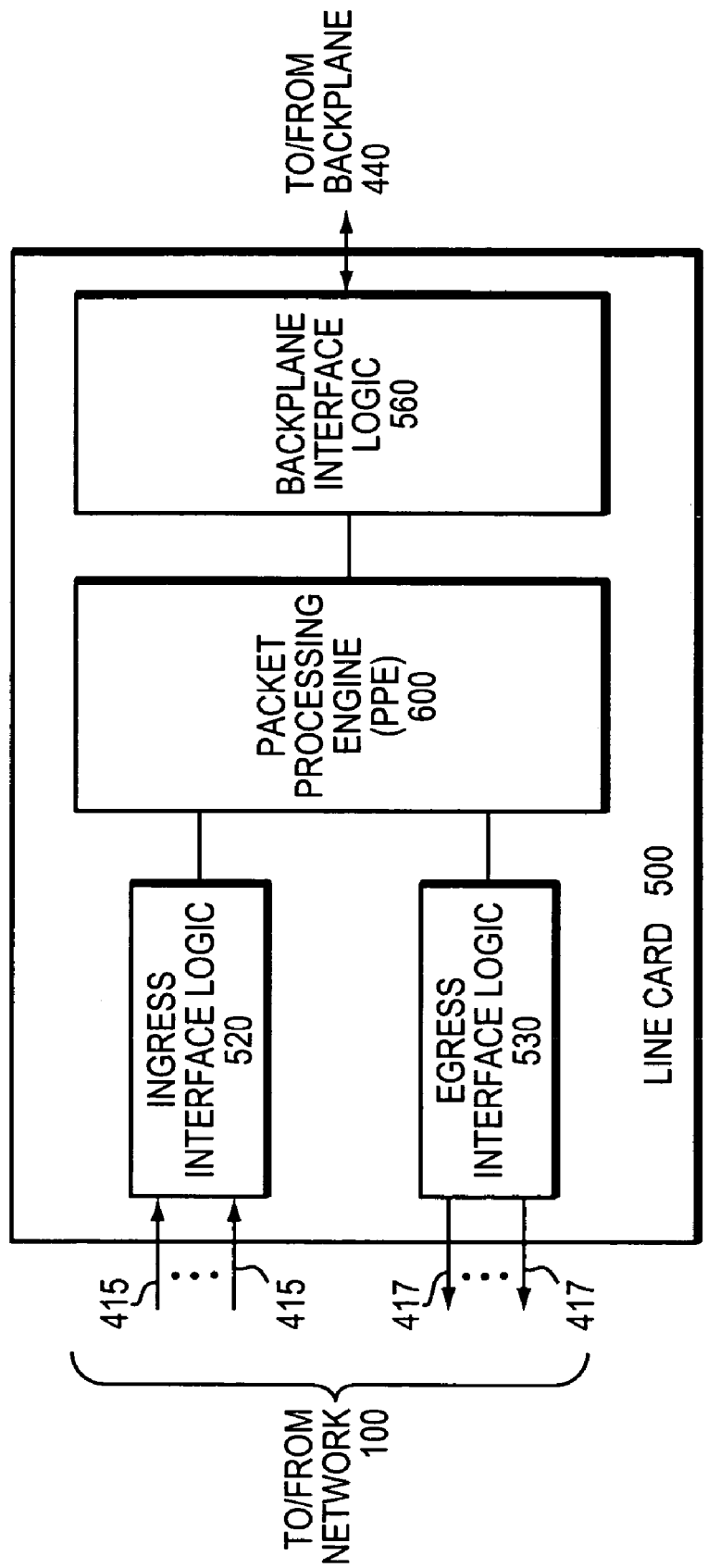
FIG. 5 is a partial schematic block diagram of a line card that may be advantageously used with the present invention.

The line cards 500 couple the intermediate node 400 with the network 100 and are, inter alia, configured to transfer and acquire data to and from the network via egress interfaces 417 and ingress interfaces 415, respectively, using various protocols, such as the SONET/SDH protocol, in accordance with the inventive technique. FIG. 5 is a partial schematic block diagram of a line card 500 that may be advantageously used with the present invention. Line card 500 comprises ingress interface logic 520 and egress interface logic 530 coupled to a PPE 600, which is further coupled to backplane interface logic 560. The backplane interface logic 560 contains interface circuitry that interfaces the line card 500 to the backplane 440 and enables the line card 500 to transfer and acquire data to and from other cards coupled to the backplane 440. The ingress interface logic 520 and egress interface logic 530 interface the line card to the network 100 via the ingress 415 and egress 417 interfaces, respectively, and enable the line card 500 to transfer and acquire data to and from the network 100. To that end, logic 520 and 530 comprise conventional interface circuitry that may incorporate the signal, electrical and mechanical characteristics, and interchange circuits, needed to interface line card 500 with the network's physical media and protocols running over that media.

Figure 6:
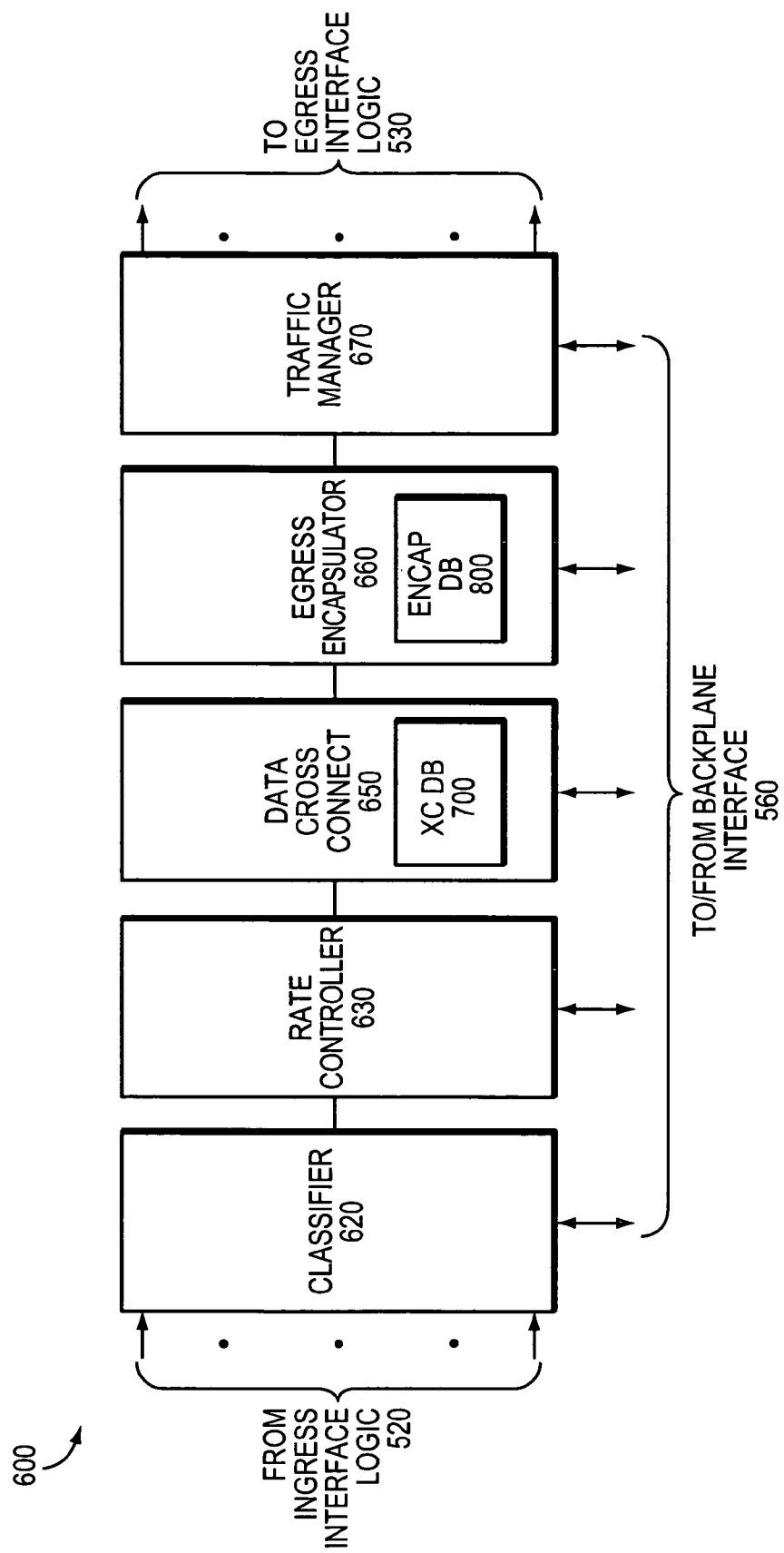
FIG. 6 is a partial schematic block diagram of a packet-processing engine that may be advantageously used with the present invention.

The PPE 600 contains logic that processes data (packets) acquired by the ingress interface logic 520. FIG. 6 is a schematic block diagram of a PPE 600 that may be advantageously used with the present invention. Packets are processed by various stages contained in the PPE including a classifying stage, rate control stage, data cross connect stage, egress encapsulation stage and traffic management stage implemented as classifier 620, rate controller 630, data cross connect 650, egress encapsulator 660 and traffic manager 670, respectively.

The classifier 620 contains circuitry configured to classify traffic acquired by the ingress interface logic 520 as belonging to a sub-interface by, e.g., examining headers in packets received on the interface. Specifically, classifier 620 examines a packet's contents and determines a virtual port identifier (ID) associated with the packet. The virtual port ID identifies the sub-interface associated with the packet. The classifier 620 derives an ingress key from the virtual port ID and associates the ingress key with the packet. The packet and its ingress key are then transferred to the rate controller 630.

The rate controller 630 contains circuitry configured to police a packet acquired by a particular sub-interface associated with the packet. Illustratively, the policing action is controlled by various parameters associated with the rate controller including a committed information rate (CIR), a CIR burst size, a peak information rate (PIR) and a PIR burst size. Packets that adhere to a rate controller's parameters are transferred to the data cross connect logic 650 for further processing.

The data cross connect 650 contains circuitry that "switches" a packet from an ingress interface 415 to an egress interface 417. The data cross connect 650 contains a cross connect database (XC DB) 700 configured to hold information that establishes a relationship between an ingress interface and an egress interface. The information contained in XC DB 700 is derived from transport database information 300 acquired from the transport controller 200 (FIG. 2). As noted above, this information includes labels that define, e.g., paths associated with pseudo wires. Specifically, XC DB 700 holds information that associates an ingress interface's ingress key with an egress interface's egress key. The egress and ingress key values are derived from egress and ingress interface information, respectively, contained in the transport database information acquired by the node 400.

Figure 7:
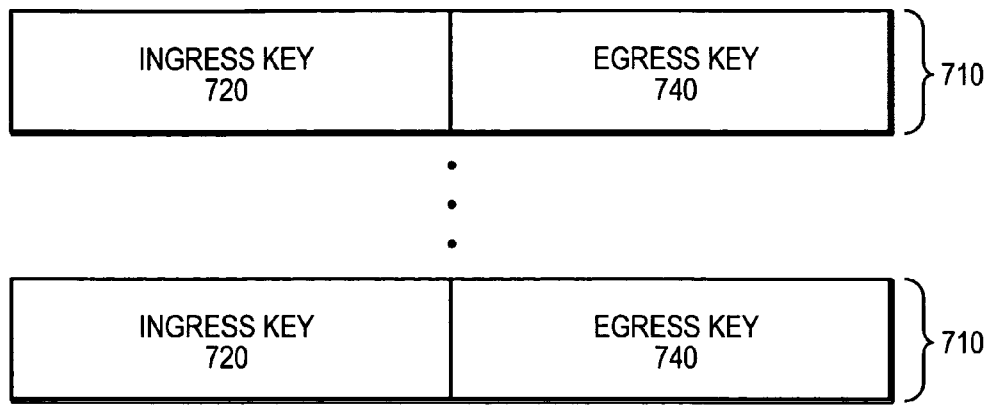
FIG. 7 is a schematic block diagram of a data cross connect database that may be advantageously used with the present invention.

FIG. 7 is a schematic block diagram of XC DB 700 illustrated as a table containing one or more entries 710 wherein each entry 710 contains an ingress key field 720 and an egress key field 740. The ingress key field 720 holds an ingress key value that is derived from the ingress interface information contained in the transport database information distributed to the node 400. Likewise, the egress key field 740 holds an egress key value that is derived from the egress interface information contained in the transport database information distributed to the node 400.

Referring also to FIG. 6., the data cross connect 650 switches packets by determining if an ingress key associated with the packet matches an ingress key 720 contained in a XC DB entry 710. If so, the packet is "switched" to the egress interface 417 associated with the matching entry's egress key 740 by associating the packet with the egress key 740. The packet and egress key 740 are then transferred to the egress encapsulator 660.

Figure 8:
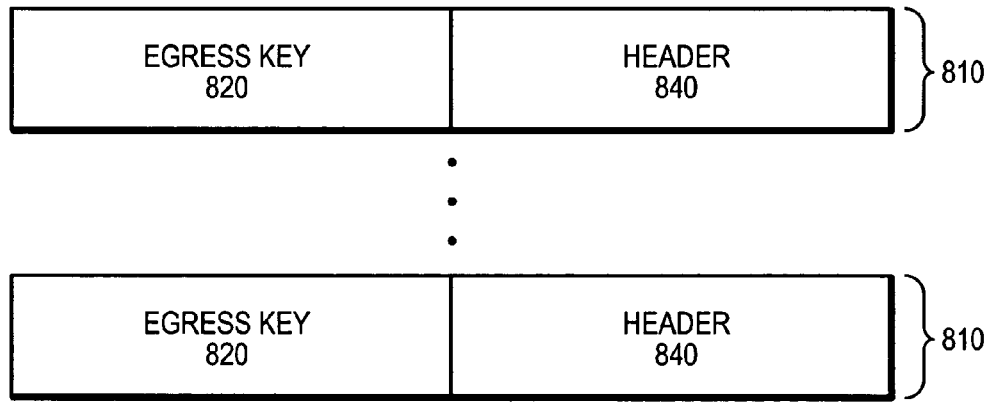
FIG. 8 is a schematic block diagram of an egress encapsulation database that may be advantageously used with the present invention.

The egress encapsulator 660 contains circuitry configured to encapsulate (if necessary) the packet before it is transferred onto the network. This encapsulation may include, e.g., inserting a Multiprotocol Label Switching (MPLS) header, an IEEE 802.1Q header or a transport label header (discussed below) into the packet. Egress encapsulation logic 660 contains an encapsulation database (ENCAP DB) 800 that is used to determine the form of encapsulation (if any) that is performed on the packet. FIG. 8 is a schematic block diagram of ENCAP DB 800 configured as a table comprising one or more entries 810. Entry 810 contains an egress key field 820 that holds a value that represents an egress key and a header field 840 that holds information that specifies header information (if any) that is inserted into the packet.

Specifically, the egress key 740 associated with the packet is compared with egress keys 820 contained in the ENCAP DB 800 to determine if an entry 810 contains an egress key 820 that matches the packet's egress key 740. If so, the packet is encapsulated in accordance with the header information specified in the header field 840. Otherwise, if the packet's egress key 740 does not match any of the egress keys 820 contained in the ENCAP DB, no encapsulation is performed.

After the encapsulation (if any) is complete, the packet is transferred to the traffic manager 670 which schedules the packet for transfer onto the network. Specifically, the packet is enqueued onto an output queue (not shown) associated with the packet's egress key 740. The packet is then scheduled for transfer onto a particular egress interface 417 associated with the output queue.

It should be noted that the functions performed by various stages in the PPE may be implemented, either in whole or in part, using computer executable instructions that are stored on a computer readable medium, such as a random-access memory or a disk. Further, one skilled in the art would know that electromagnetic signals may be generated to carry computer executable instructions that implement aspects of the present invention over, e.g., a wireless data link or a data network such as the Internet.

Figure 9:
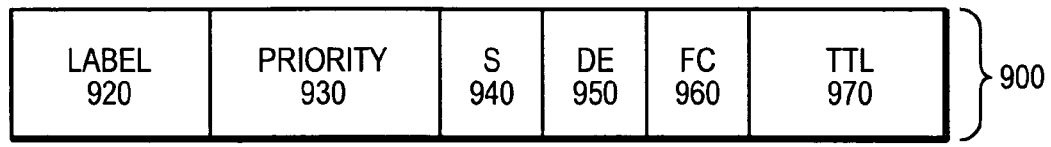
FIG. 9 is a schematic block diagram of a transport label that may be advantageously used with the present invention.

As noted above, a packet may be encapsulated with a transport label header. FIG. 9 illustrates a transport label header 900 that may be advantageously used with the present invention. Header 900 comprises a label field 920, a priority field 930, a stack (S) field 940, a discard eligible (DE) field 950, a frame check (FC) field 960 and a time-to-live (TTL) field 970. The label field 920 is illustratively a 20-bit field that contains a value that represents a label that used for switching the packet through the network 100. The priority field 930 is illustratively a 3-bit field that contains a value that establishes a priority associated with the packet. The S field 940 is illustratively a one-bit field that contains a value that if set indicates that the label field 920 contains the last label in a stack of labels contained in the packet. The DE field 950 is illustratively a one-bit field that contains a value that if set to a one indicates the packet is eligible for discard. The FC field 960 is illustratively a one-bit field that contains a value that if set indicates the payload of the packet contains a frame check sequence (FCS). The TTL field 970 is illustratively a 6-bit field that contains a value that represents a time-to-live value associated with the packet.

Figure 10:
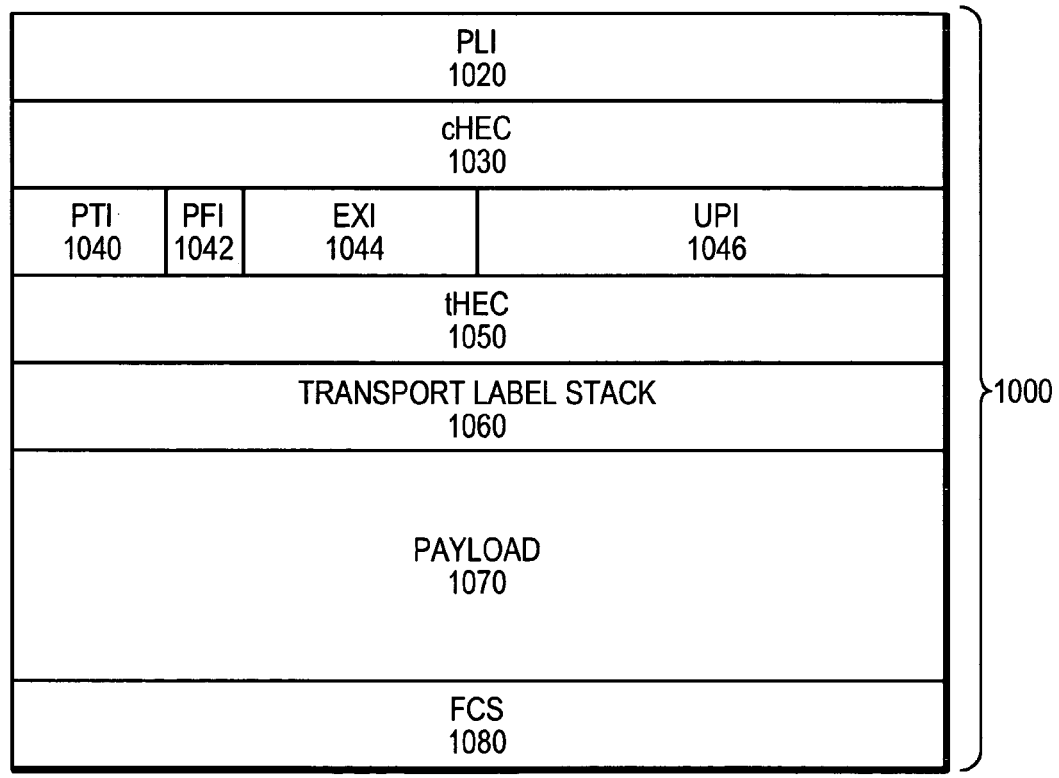
FIG. 10 is a schematic block diagram of a generic framing procedure (GFP) Synchronous Optical NETwork/Synchronous Digital Hierarchy (SONET/SDH) packet in accordance with the inventive technique.

In accordance with the inventive technique, packets are encapsulated by placing a transport label header 900 in a frame containing the packet. FIG. 10 illustrates a generic framing procedure (GFP) SONET/SDH frame 1000 encapsulated in accordance with the present invention. Frame 1000 contains a protocol data unit (PDU) length indicator (PLI) field 1020, a core header error control (cHEC) field 1030, a payload type identifier (PTI) field 1040, a payload FCS identifier (PFI) field 1042, an extension header identifier (EXI) field 1044, a user payload identifier (UPI) field 1046, a type header error control (tHEC) field 1050, a transport label stack field 1060, a payload field 1070 and an optional payload FCS field 1080.

A GFP frame 1000 may be classified as containing a core header and a payload area wherein the core header comprises the PLI field 1020 and the cHEC field 1030 and the payload area comprises the remaining fields of the GFP frame. The PLI field 1020 contains a value that indicates a number of bytes in the payload area of the GFP frame. The cHEC field 1030 contains a value that represents a cyclic redundancy check (CRC) of the core header. The PTI field 1040 contains an identifier that identifies the content and format of the GFP payload. The PFI field contains an indicator that indicates whether the payload field 1070 is followed by a payload FCS field 1080. The EXI field 1044 contains an identifier that identifies an extension header. The UPI field 1046 contains an identifier that identifies the payload 1070. The tHEC field 1050 contains a CRC value that protects the integrity of the contents of the PTI 1040, PFI 1042, EXI 1044, UPI 1046 and tHEC 1050 fields. The transport label stack field 1060 contains a "stack" of one or more labels which may include e.g., MPLS labels and/or a transport label 900. The payload field 1070 contains user data information and the FCS field 1080 contains a CRC value that protects the contents of the payload field 1070.

Figure 11:
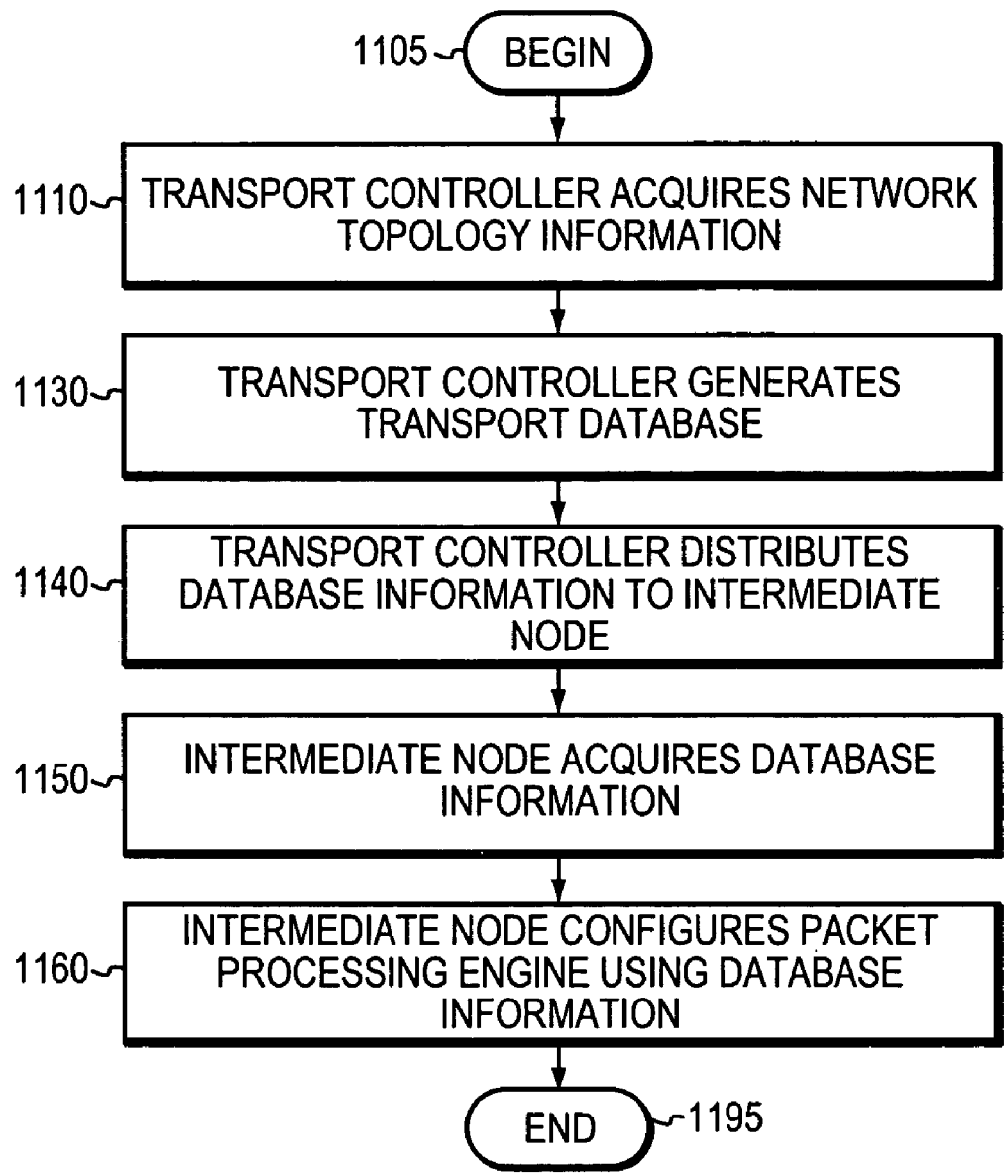
FIG. 11 is a flow diagram of a sequence of steps that may be advantageously used to configure an intermediate node in accordance with the inventive technique.

The transport controller 200 acquires network topology information, generates the transport database 300 from this information, and distributes the transport database information to the various intermediate nodes 400 in the network. The intermediate nodes 400 use the transport database information to configure the PPE 600. FIG. 11 is a flow diagram of a sequence of steps that may be used to generate and distribute the transport database information, and use the transport database information to configure the PPE 600 in accordance with the inventive technique.

The sequence begins at Step 1105 and proceeds to Step 1110 where the transport controller 200 acquires network topology information that describes aspects of the network 100 and places the information in the network topology data structure 252. The topology information may include identifiers that identify nodes contained in the network, e.g., nodes 400, point-to-point connections between various nodes in the network, interfaces associated with these point-to-point connections, labels associated with the interfaces, one or more definitions of pseudo wires contained in the network, and so on. Illustratively, a user using a network management application running on the transport controller 200 specifies the topology information. Alternatively, all or portions of this information may be acquired from another system in communication with the transport controller 200, or a protocol running on the transport controller 200 that is capable of gathering all or some of this information, from e.g., the nodes 400.

At Step 1130, the transport controller 200 generates transport database 300 from the network topology information 252. Specifically, transport controller examines the network topology information 252 and determines label and interface information for paths, such as pseudo wires, defined in the topological information. The transport controller 200 then generates entries in the transport database 300 that define these paths, including identifiers that identify interfaces and labels associated with the paths.

At Step 1140, the transport controller 200 distributes the transport database information 300 to the intermediate nodes 400, illustratively, via the local network links 190.

At Step 1150 and 1160, an intermediate node 400 acquires the transport database information and configures the PPE 600 using the information. Specifically, the intermediate node 400 generates ingress keys and egress keys from the ingress interface and egress interface information, respectively, and uses the generated key information to configure the classifier logic 620, data cross connect 650 and egress encapsulator 660 for use by these components, in a manner as described above. Node 400 also uses the relationship established by the ingress and egress interfaces in the transport database information to generate relationships between the ingress and the egress keys that are used by the PPE's various components. In addition, the ingress label and egress label information may be used by the egress encapsulation logic to determine labels 900 placed in a frame's label stack, such as transport label stack 1060. At Step 1195 the sequence ends.

Figure 12:
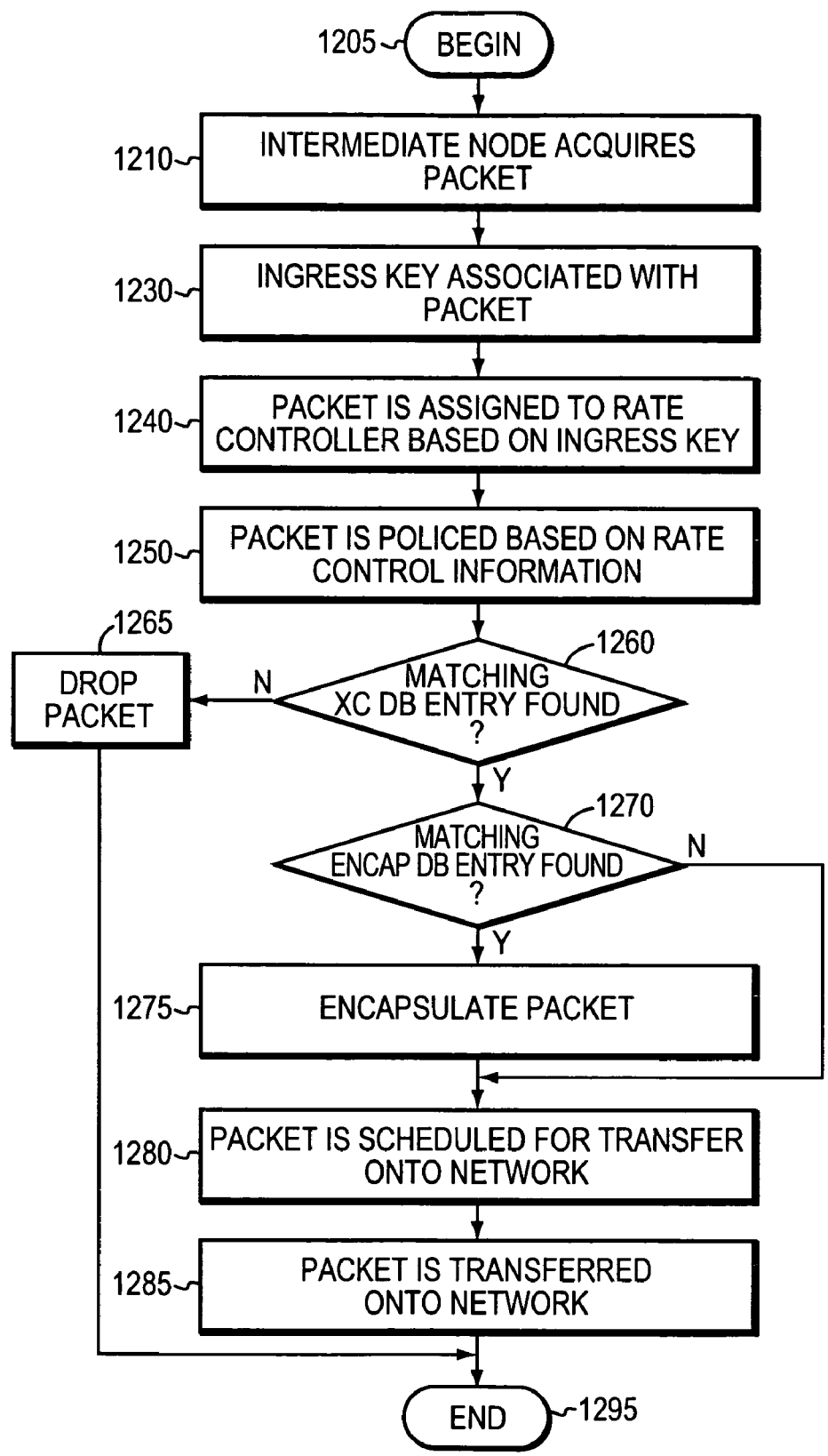
FIG. 12 is a flow diagram of a sequence of steps that may be advantageously used to process a data packet in accordance with the inventive technique.

Illustratively, an intermediate node 400 that acquires a packet transfers the packet to the PPE 600 for further processing. FIG. 12 is a sequence of steps that may be used to process a packet at an intermediate node 400 in accordance with the inventive technique. The sequence begins at Step 1205 and proceeds to Step 1210 where an intermediate node 400 acquires a packet from another intermediate node 400 via a data link 190 or from a customer edge node 120 via a data link 180. At Step 1230, the classifier logic 620 examines the packet and associates an ingress key with the packet based on information contained in the packet. The classifier 620 then transfers the packet and ingress key to the rate controller 630 (Step 1240).

At Step 1250, the rate controller polices the packet based on various rate control information as described above. The policed packet is then transferred from the rate controller to the data cross connect 650 which determines if the ingress key associated with packet matches an ingress key 720 contained in an entry 710 in the XC DB 700 (Step 1260). If not, the sequence proceeds to Step 1265 where the packet is dropped. The sequence then ends at Step 1295.

At Step 1260, if a matching entry 710 is found, the packet is associated with the egress key 740 contained in the matching entry 710. Next, at Step 1270, the packet and egress key are transferred to the egress encapsulator 660 where the egress key is compared with entries 810 in the encapsulation database 800 to determine if an entry 810 in the database contains an egress key 820 that matches the egress key associated with the packet. If not, the sequence proceeds to Step 1280. Otherwise, the sequence proceeds to Step 1275 where the packet is encapsulated in accordance with the header information 840 contained in the matching entry 810. At Step 1280 the traffic manager 670 schedules the packet for transfer onto the network. The packet eventually leaves the traffic manager 670 and transferred to the egress interface logic 530 for transfer onto the network (Step 1280). The sequence ends at Step 1295.

The foregoing description has been directed to specific embodiments of this invention. It will be apparent that other variations and modifications may be made to the described embodiments, with the attainment of some or all of their advantages. Therefore, it is an object of the appended claims to cover all such variations and modifications as come within the true spirit and scope of the invention.

What is claimed is:

1. A method comprising:
   acquiring, at a transport controller coupled via one or more local network links to one or more intermediate nodes, network topology information that describes a data network's topology;
   generating, at the transport controller, a transport database from the network topology information, wherein the transport database contains pseudo wire path information that defines paths through intermediate nodes by mapping an ingress label and an ingress interface at a corresponding intermediate node to an egress label and an egress interface at the corresponding intermediate node, the transport database to maintain pseudo wire path information for a plurality of pseudo wires contained in the data network; and
   distributing pseudo wire path information contained in the transport database from the transport controller, via the one or more local network links, to one or more packet-processing engines (PPEs) contained at the one or more intermediate nodes, to configure the PPEs of the one or more intermediate nodes, based on the pseudo wire path information, to direct data packets acquired by the one or more intermediate nodes on an ingress interface indicated in the distributed pseudo wire path information for a particular one of the plurality of pseudo wires to an egress interface indicated in the distributed pseudo wire path information for the particular one of the plurality of pseudo wires, to obviate a need to implement layer-3 (L3) infrastructure that includes Label Distribution Protocol (LDP) to support pseudo wires.

2. The method as defined in claim 1 wherein the transport controller is configured as a transport circuit management system configured to manage transport circuits in the data network.

3. The method as defined in claim 1 wherein the transport database contains one or more entries wherein each entry includes a mapping of an ingress label and an ingress interface at a corresponding intermediate node to an egress label and an egress interface at the corresponding intermediate node.

4. The method as defined in claim 1 comprising:
acquiring pseudo wire path information from the transport database at an intermediate node; and
configuring one or more PPEs contained at the intermediate node with the acquired pseudo wire path information.

5. The method as defined in claim 1 comprising:
generating one or more ingress keys from the ingress interface indicated in the pseudo wire path information for the particular one of the plurality of pseudo wires; and
generating one or more egress keys from the egress interface indicated in the pseudo wire path information for the particular one of the plurality of pseudo wires.

6. The method as defined in claim 5 wherein each PPE contains a classifying stage, a data cross connect stage, and an egress encapsulation stage.

7. The method as defined in claim 6 comprising:
configuring the classifying stage, data cross connect stage and egress encapsulation stage using the generated one or more ingress keys and one or more egress keys.

8. The method as defined in claim 1 comprising:
acquiring a data packet at an intermediate node; and
associating the acquired data packet with an ingress key.

9. The method as defined in claim 8 wherein the intermediate node contains a cross connect database comprising one or more entries wherein each entry contains an ingress key and an egress key.

10. The method as defined in claim 9 comprising:
comparing the packet's ingress key with an ingress key contained in the cross connect database to determine if they match; and
if so, associating the packet with an egress key contained in the matching entry.

11. The method as defined in claim 10 wherein the intermediate node contains an encapsulation database comprising one or more entries wherein each entry contains an egress key and an encapsulation header.

12. The method as defined in claim 11 comprising:
comparing the packet's egress key with an egress key contained in the encapsulation database to determine if they match; and
if so, encapsulating the packet in accordance with the encapsulation header contained in the matching entry.

13. An apparatus comprising:
a network topology data structure to store topology information of a data network;
a transport database to store pseudo wire path information that defines paths through intermediate nodes by mapping an ingress label and an ingress interface at a corresponding intermediate node to an egress label and an egress interface at the corresponding intermediate node, the transport database to maintain pseudo wire path information for a plurality of pseudo wires defined in the data network;
a processor configured to generate pseudo wire path information from the topology information, place the pseudo wire path information in the transport database and distribute pseudo wire path information contained in the transport database via one or more local network links to one or more packet-processing engines (PPEs) of one or more intermediate nodes contained in the data network, to configure the PPEs of the one or more intermediate nodes based on the pseudo wire path information to direct data packets acquired by the one or more intermediate nodes on an ingress interface indicated in the pseudo wire path information for a particular one of the plurality pseudo wires to an egress interface indicated in the distributed pseudo wire path information for the particular one of the plurality of pseudo wires, to obviate a need to implement layer-3 (L3) infrastructure that includes Label Distribution Protocol (LDP) to support pseudo wires; and
a network interface configured to transmit the distributed pseudo wire path information over the one or more local network links.

14. An intermediate node comprising:
an ingress interface configured to acquire data packets from a data network coupled to the intermediate node;
a network interface configured to acquire pseudo wire path information that includes a mapping of an ingress label and an ingress interface at the intermediate node to an egress label and an egress interface at the intermediate node for each of a plurality of pseudo wires in the data network, the pseudo wire path information acquired from a separate transport controller contained in the data network; and
a packet-processing engine (PPE) that is configured based on the pseudo wire path information acquired from the separate transport controller contained in the data network to direct data packets acquired on an ingress interface indicated in the pseudo wire path information acquired from the separate transport controller for a particular one of plurality of the pseudo wires to an egress interface indicated in the pseudo wire path information acquired from the separate transport controller for the particular one of plurality of the pseudo wires,
wherein the PPE is configured absent use of layer-3 (L3) infrastructure that includes Label Distribution Protocol (LDP) by the intermediate node.

15. The intermediate node as defined in claim 14 comprising:
a rate controller configured to police the acquired packet based on the packet's ingress key.

16. The intermediate node as defined in claim 14 comprising:
a classifier configured to associate packets acquired by the ingress interface with an ingress key.

17. The intermediate node as defined in claim 16 comprising:
a cross connect database containing one or more entries wherein each entry contains an ingress key and an egress key; and
a data cross connect configured to:
a) determine if the ingress key associated with an acquired packet matches an ingress key contained in an entry in the cross connect database, and
b) if so, associate the packet with an egress key contained in the matching entry.

18. The intermediate node as defined in claim 17 comprising:
an egress encapsulation database containing one or more entries wherein each entry contains an egress key and a header; and
an egress encapsulator configured to:
a) determine if the egress key associated with the packet matches an egress key contained in an entry of the egress encapsulation database, and
b) if so, encapsulate the packet in accordance with information the header contained in the matching entry.

19. The intermediate node as defined in claim 18 comprising:
a traffic manager configured to schedule the data packet for transfer onto the data network based on the packet's egress key.

20. An apparatus comprising:
means for acquiring network topology information that describes a data network's topology at the apparatus, wherein the apparatus is coupled via one or more local network links to one or more intermediate nodes;
means for generating a transport database from the network topology information, wherein the transport database contains pseudo wire path information that defines paths through intermediate nodes by mapping an ingress label and an ingress interface at a corresponding intermediate node to an egress label and an egress interface at the corresponding intermediate node, the transport database to maintain pseudo wire path information for a plurality of pseudo wires contained in the data network; and
means for distributing pseudo wire path information contained in the transport database, via the one or more local network links, to one or more packet-processing engines (PPEs) of the intermediate nodes contained in the data network, to configure the PPEs of the one or more intermediate nodes, based on the pseudo wire path information, to direct data packets acquired by the one or more intermediate nodes on an ingress interface indicated in the distributed pseudo wire path information for a particular one of the plurality of pseudo wires to an egress interface indicted in the distributed pseudo wire path information for the particular one of the plurality of pseudo wires, to obviate a need to implement layer-3 (L3) infrastructure that includes Label Distribution Protocol (LDP) to support pseudo wires.

21. The method as defined in claim 1 wherein the one or more local network links operate as an out-of-band network, separate from one or more other network links that interconnect the one or more intermediate nodes with each other.

22. A system comprising:
a transport controller that is aware of network topology information that describes a network's topology, the transport controller including,
    a transport database generated from the network topology information, the transport database configured to store one or more entries of pseudo wire path information that map an ingress label and an ingress interface to an egress label and an egress interface for each of a plurality of pseudo wires contained in the network, and
    a network interface configured to transmit pseudo wire path information from the transport database over one or more local network links;
a local network including the one or more local network links and configured to provide out-of-band communication between the transport controller and a plurality of intermediate nodes; and
wherein one or more of the plurality of intermediate nodes includes,
    an ingress interface configured to receive data packets from the network,
    a network interface configured to receive the transmitted pseudo wire path information from the transport controller via the local network, and
    a packet-processing engine (PPE) configured to generate one or more ingress keys and egress keys from the transmitted pseudo wire path information from the transport controller, and to use the generated ingress keys and egress keys to configure a classifier of the PPE to direct data packets received on the ingress interface to an egress interface indicted in the transmitted pseudo wire path information for a particular one of the plurality of pseudo wires, wherein the PPE is configured absent use of layer-3 (L3) infrastructure that includes Label Distribution Protocol (LDP).

23. A method comprising:
acquiring, at an intermediate node, data packets from a data network;
acquiring, at the intermediate node, pseudo wire path information from a transport controller in the data network coupled to the intermediate node via one or more local network links, the pseudo wire path information including a mapping of an ingress label and ingress interface to an egress label and an egress interface at the intermediate node for each of a plurality of pseudo wires in the data network; and
configuring a packet-processing engine (PPE) of the intermediate node based on the pseudo wire path information acquired from the transport controller, the PPE configured to direct data packets acquired at the intermediate node on an ingress interface indicated in the pseudo wire path information acquired from the transport controller for a particular one of the plurality of pseudo wires to an egress interface indicated in the pseudo wire path information acquired from the transport controller for the particular one of the plurality of pseudo wires,
wherein the PPE is configured absent use of layer-3 (L3) infrastructure that includes Label Distribution Protocol (LDP) by the intermediate node.

\* \* \* \* \*